(12) United States Patent
Simos

(10) Patent No.: US 11,234,426 B2
(45) Date of Patent: Feb. 1, 2022

(54) FISHHOOK REMOVER

(71) Applicant: Timotheos G. Simos, N. Hutchinson Isl, FL (US)

(72) Inventor: Timotheos G. Simos, N. Hutchinson Isl, FL (US)

( * ) Notice: Subject to any disclaimer, the term of this patent is extended or adjusted under 35 U.S.C. 154(b) by 273 days.

(21) Appl. No.: 16/449,088

(22) Filed: Jun. 21, 2019

(65) Prior Publication Data

US 2019/0387731 A1   Dec. 26, 2019

Related U.S. Application Data

(60) Provisional application No. 62/688,363, filed on Jun. 21, 2018.

(51) Int. Cl.
*A01K 97/18*   (2006.01)

(52) U.S. Cl.
CPC ................... *A01K 97/18* (2013.01)

(58) Field of Classification Search
CPC .................................................. A01K 97/18
USPC ......................................................... 43/53.5
See application file for complete search history.

(56) References Cited

U.S. PATENT DOCUMENTS

| | | | | |
|---|---|---|---|---|
| 2,507,083 A * | 5/1950 | Anderson | ............... | A01K 97/18 43/53.5 |
| 2,578,289 A * | 12/1951 | Danielson | ............... | A01K 97/18 43/53.5 |
| 2,669,055 A * | 2/1954 | Doerr | ...................... | A01K 97/18 43/53.5 |
| 2,688,816 A * | 9/1954 | Bondesen | ............... | A01K 97/18 43/53.5 |
| 2,795,887 A * | 6/1957 | Lockert | .................. | A01K 97/18 43/53.5 |
| 2,797,523 A * | 7/1957 | Carvel | ................... | A01K 97/18 43/53.5 |

(Continued)

FOREIGN PATENT DOCUMENTS

| | | | | |
|---|---|---|---|---|
| DE | 3204976 A1 * | 8/1983 | ............. | A01K 97/18 |
| EP | 0116504 B1 * | 6/1987 | ............. | A01K 97/18 |

(Continued)

OTHER PUBLICATIONS

Translation of DE 3204976 (Year: 1983).*
Translation of KR 2010-0000728 (Year: 2010).*

*Primary Examiner* — Darren W Ark
(74) *Attorney, Agent, or Firm* — Nolan IP Law; Jason M. Nolan

(57) ABSTRACT

A fishhook remover for dehooking a fishhook from a catch is provided. The fishhook remover includes a hollow shaft having a first end, a second end, and a bore extending from a handle provided at the first end to an opening provided at the second end. The fishhook remover includes a retractable grabber within the bore of the hollow shaft and extending out from the second end for grabbing/retaining the fishhook, and an actuating member slidably engaging the hollow shaft between the first and second ends for actuating the grabber between an extended position and a retracted position. The fishhook remover includes a fishhook alignment needle for engaging the eye of the fishhook. The needle can be in proximity to the second end of the hollow shaft and configured to orient the fishhook in a position where it can be engaged by the grabber.

17 Claims, 13 Drawing Sheets

(56) References Cited

U.S. PATENT DOCUMENTS

| | | | | |
|---|---|---|---|---|
| 2,847,793 A * | 8/1958 | Breer | ................... | A01K 97/18 43/53.5 |
| 2,892,284 A * | 6/1959 | Shawhan | ............... | A01K 97/18 43/53.5 |
| 2,947,106 A * | 8/1960 | Lewan | ................... | A01K 97/18 43/53.5 |
| 2,972,205 A * | 2/1961 | Wear | ...................... | A01K 97/18 43/53.5 |
| 3,011,286 A * | 12/1961 | Wallace | .................... | F25J 3/08 43/53.5 |
| 3,132,438 A * | 5/1964 | Ward | ..................... | A01K 97/18 43/53.5 |
| 3,287,845 A * | 11/1966 | Smith | ................... | A01K 97/18 43/53.5 |
| 3,419,924 A * | 1/1969 | Archibald | ............. | A01K 91/04 7/106 |
| 3,451,157 A * | 6/1969 | Jones | .................... | A01K 97/18 43/53.5 |
| 3,588,078 A * | 6/1971 | Van De Sande | ....... | A01K 91/04 269/6 |
| 3,721,034 A * | 3/1973 | Collins | .................. | A01K 97/18 43/53.5 |
| 3,820,274 A * | 6/1974 | Drenzyk | ................ | A01K 97/18 43/53.5 |
| 4,077,618 A * | 3/1978 | Durant | ................... | A01K 85/08 269/130 |
| 4,342,171 A * | 8/1982 | Cripps | ................... | A01K 97/18 43/53.5 |
| 4,590,702 A * | 5/1986 | Chestnutt | ............... | A01K 97/18 43/53.5 |
| 4,833,817 A * | 5/1989 | Silverthorn | ............ | A01K 97/18 43/53.5 |
| 5,201,139 A * | 4/1993 | Middleton | ............. | A01K 97/18 294/26 |
| 5,307,586 A * | 5/1994 | Palmer | ................... | A01K 97/18 43/4 |
| 5,983,555 A * | 11/1999 | Biel | ....................... | A01K 97/18 43/53.5 |
| 6,205,698 B1 * | 3/2001 | Richards | ................ | A01K 97/18 43/53.5 |
| 6,305,118 B1 * | 10/2001 | Wacha | ................... | A01K 97/00 43/4 |
| 8,667,730 B1 * | 3/2014 | Hughes | ................. | A01K 97/18 43/53.5 |
| 2003/0029075 A1 * | 2/2003 | Hebard | .................. | A01K 97/18 43/53.5 |
| 2011/0072707 A1 * | 3/2011 | Shepherd | ............... | A01K 97/18 43/53.5 |

FOREIGN PATENT DOCUMENTS

| | | | | |
|---|---|---|---|---|
| GB | 873063 A | * | 7/1961 | ............ A01K 97/18 |
| GB | 1483589 A | * | 8/1977 | ............ A01K 97/18 |
| GB | 2083991 A | * | 4/1982 | ............ A01K 97/18 |
| JP | H0611474 U | * | 2/1994 | |
| JP | 7013504 Y2 | * | 4/1995 | |
| JP | 07155097 A | * | 6/1995 | |
| JP | 09000134 A | * | 1/1997 | |
| JP | 10033102 A | * | 2/1998 | |
| JP | 10286053 A | * | 10/1998 | |
| JP | 11318304 A | * | 11/1999 | |
| JP | 2000041559 A | * | 2/2000 | |
| JP | 3046002 B2 | * | 5/2000 | |
| JP | 2001045944 A | * | 2/2001 | |
| JP | 2001161246 A | * | 6/2001 | |
| JP | 2005185185 A | * | 7/2005 | |
| JP | 2005253375 A | * | 9/2005 | |
| JP | 3148584 U | * | 2/2009 | |
| JP | 2010035421 A | * | 2/2010 | |
| JP | 3209937 U | * | 4/2017 | |
| JP | 2017216925 A | * | 12/2017 | |
| JP | 2019129728 A | * | 8/2019 | |
| KR | 20100000728 U | * | 1/2010 | |
| WO | WO-0203795 A1 | * | 1/2002 | ............ A01K 97/18 |

* cited by examiner

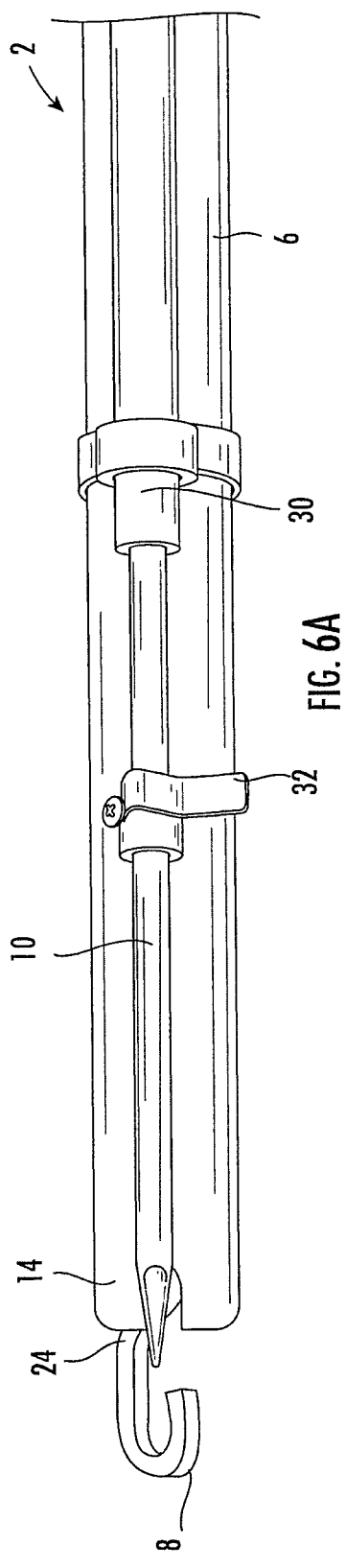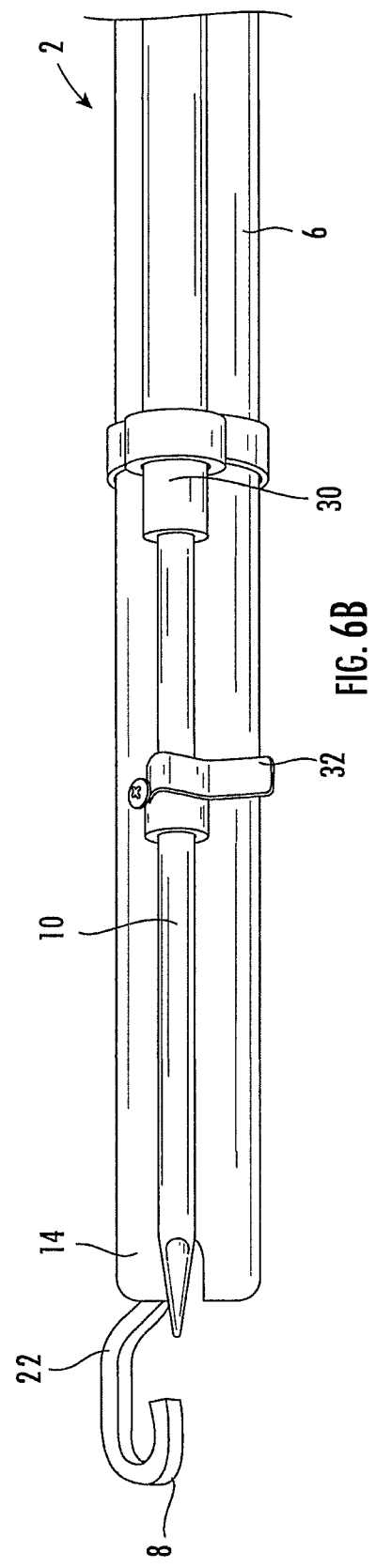

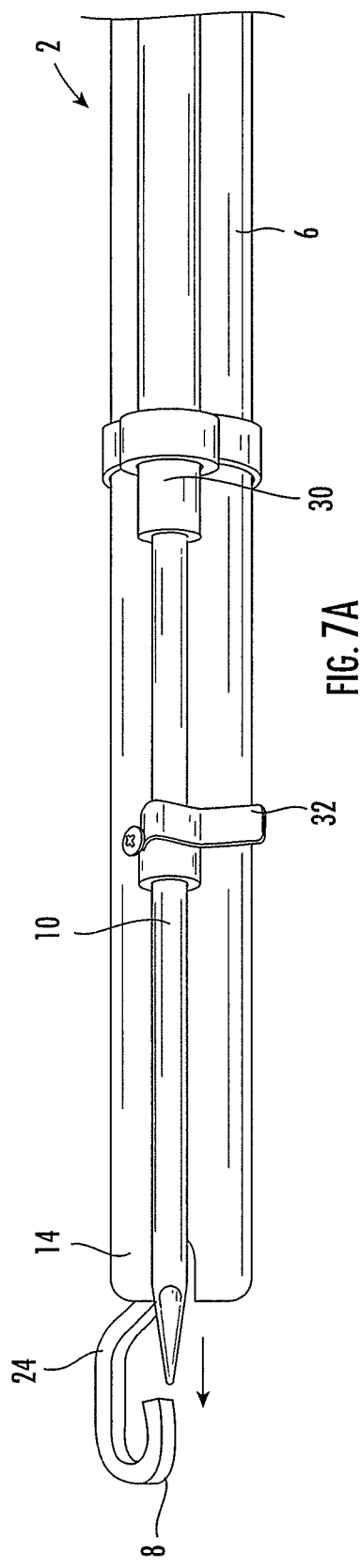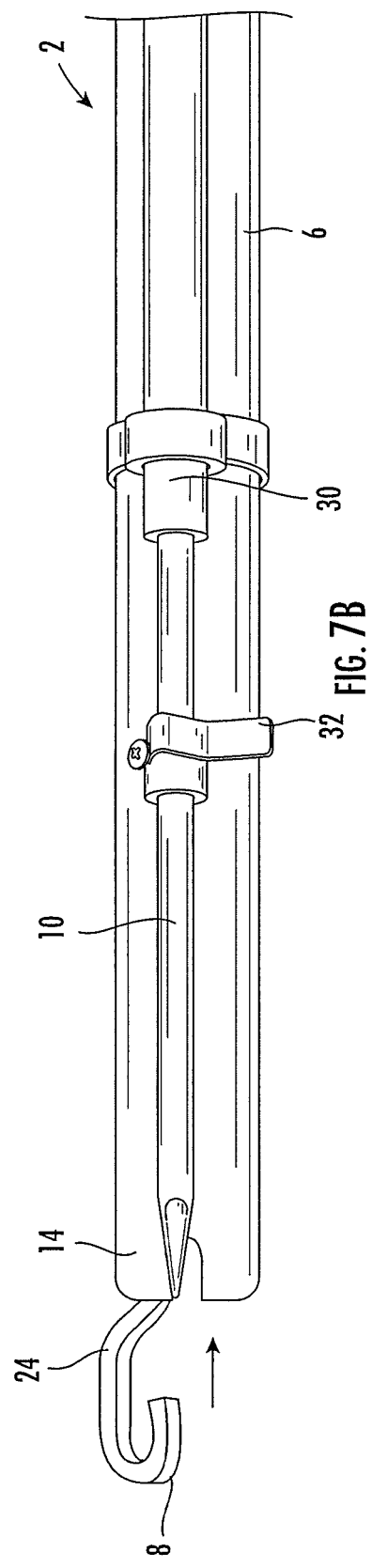

FISHHOOK REMOVER

CROSS-REFERENCE TO RELATED APPLICATIONS

The present application claims benefit of U.S. Provisional Patent Application No. 62/688,363, filed Jun. 21, 2018, the entirety of which is incorporated herein by reference.

BACKGROUND

Anglers use a variety of fishhooks to catch fish, including J-hooks, circle-hooks, and treble hooks. Depending on the fishhook and the technique used to secure the fishhook to the fish, the fishhook may be in the fish's mouth (e.g., lip), gill, or, if swallowed, in the throat or stomach. Removal of the fishhook can be very difficult and dangerous. Dehooking the fish can also cause damage to the fish's lip, gill, and/or organs.

SUMMARY

In certain embodiments, a fishhook remover for dehooking a fishhook from a catch is provided. The fishhook remover includes a hollow shaft having a first end, a second end, and a bore extending from a handle provided at the first end to an opening provided at the second end. The fishhook remover includes a retractable grabber within the bore of the hollow shaft and extending out from the second end for grabbing/retaining the fishhook, and an actuating member slidably engaging the hollow shaft between the first and second ends for actuating the grabber between an extended position and a retracted position. The fishhook remover includes a fishhook alignment needle for engaging the eye of the fishhook. The needle can be in proximity to the second end of the hollow shaft and configured to orient the fishhook in a position where it can be engaged by the grabber. During use, the grabber can be fully actuated into the retracted position when the fishhook alignment needle is inserted into the eye of the fishhook, thus, securely holding the fishhook in order to dehook it from the catch.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE FIGURES

FIG. 6A is a partial view showing the retractable grabber in an activated position as the handle is actuated, in accordance with some embodiments described herein.

FIG. 6B is a partial view showing the retractable grabber in its initial position when the handle is not actuated, in accordance with some embodiments described herein.

FIG. 7A is a partial view showing the fishhook alignment needle in its extended position when the handle is not actuated, in accordance with some embodiments described herein.

FIG. 7B is a partial view showing the retractable fishhook alignment needle in a retracted position, in accordance with some embodiments described herein.

DETAILED DESCRIPTION

Figure 1:
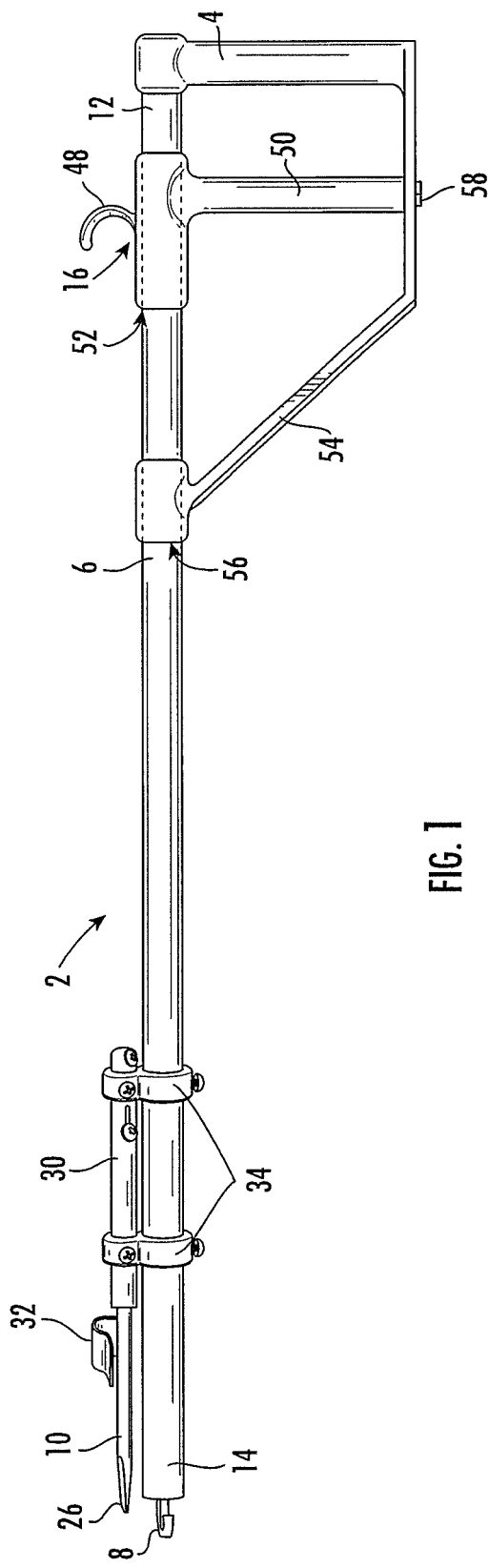
FIG. 1 is a side view of a fishhook remover in accordance with some embodiments described herein.

The description of the embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

FIGS. 1-10D illustrate various embodiments of a fishhook remover (2) for dehooking (i.e., removing) a fishhook from a catch. In some embodiments, the fishhook remover (2) comprises a shaft (6) having a first end (12), a second end (14), a handle (4) provided at the first end (12), an opening at the second end (14) where a retractable hook-shaped grabber (8) for grabbing and/or retaining the fishhook (A) is provided, and a fishhook alignment needle (10) for engaging the eye (B) of the fishhook (A) that is to be grasped and secured by the grabber (8).

Figure 4A:
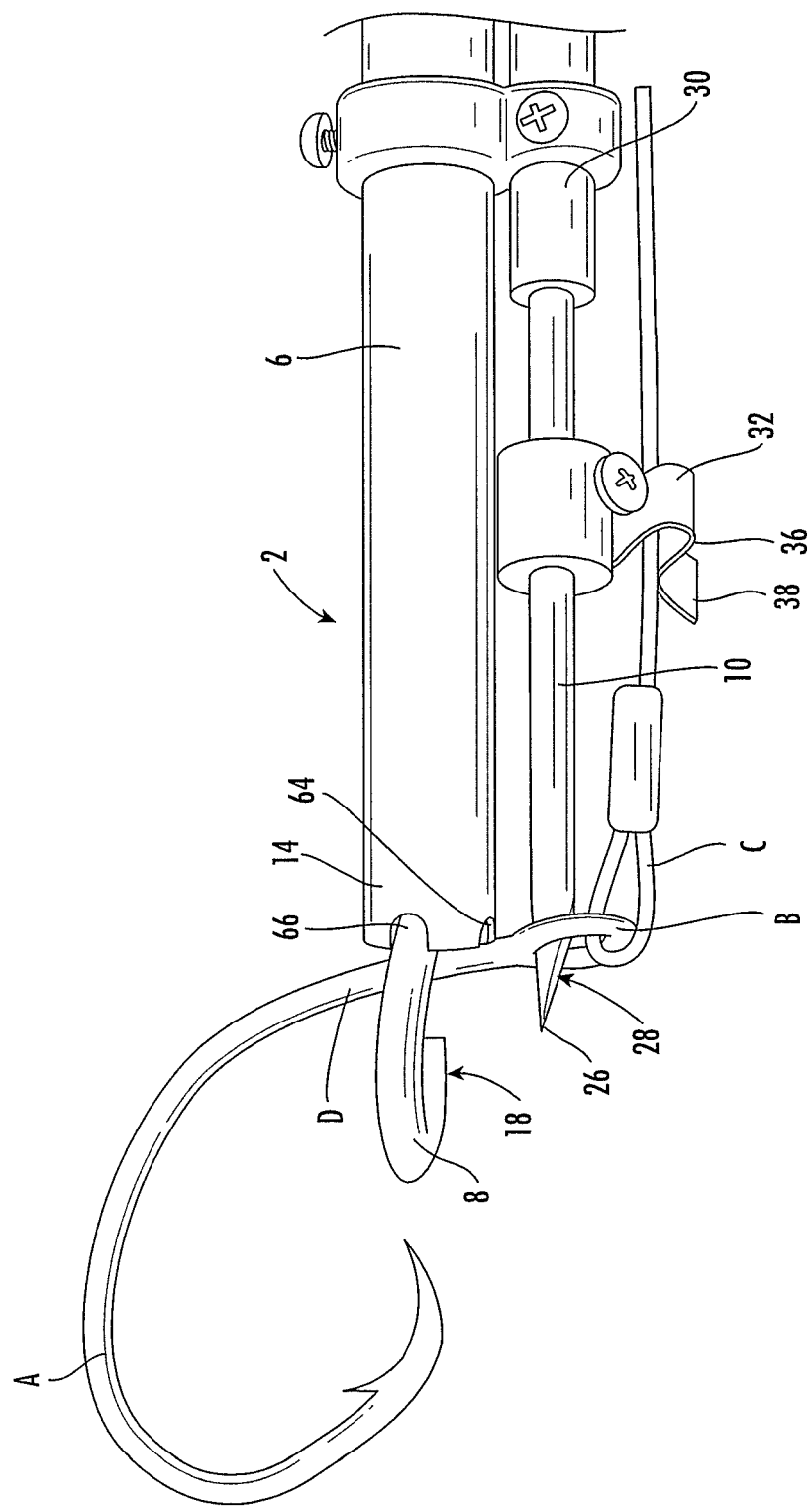
FIG. 4A shows the retractable grabber in its extended position, the guide assembly engaging the fishing line, and the fishhook alignment needle engaging the eye of the fishhook, in accordance with some embodiments described herein.

In some embodiments, the shaft (6) is a hollow shaft having a bore extending from the first end (12) to the second end (14). In some embodiments, the shaft (6) is an elongated hollow cylinder, having a tubular shape and a circular cross-section. Other cross-sectional shapes are contemplated. As shown in FIG. 1, the handle (4) is provided at the first end (12), and the retractable grabber (8) is provided at the second end (14). As shown in FIG. 4A, the retractable grabber (8) projects out from the front of the second end (14) at a distance sufficient to engage the shank (D) of a fishhook (A).

Figure 2:
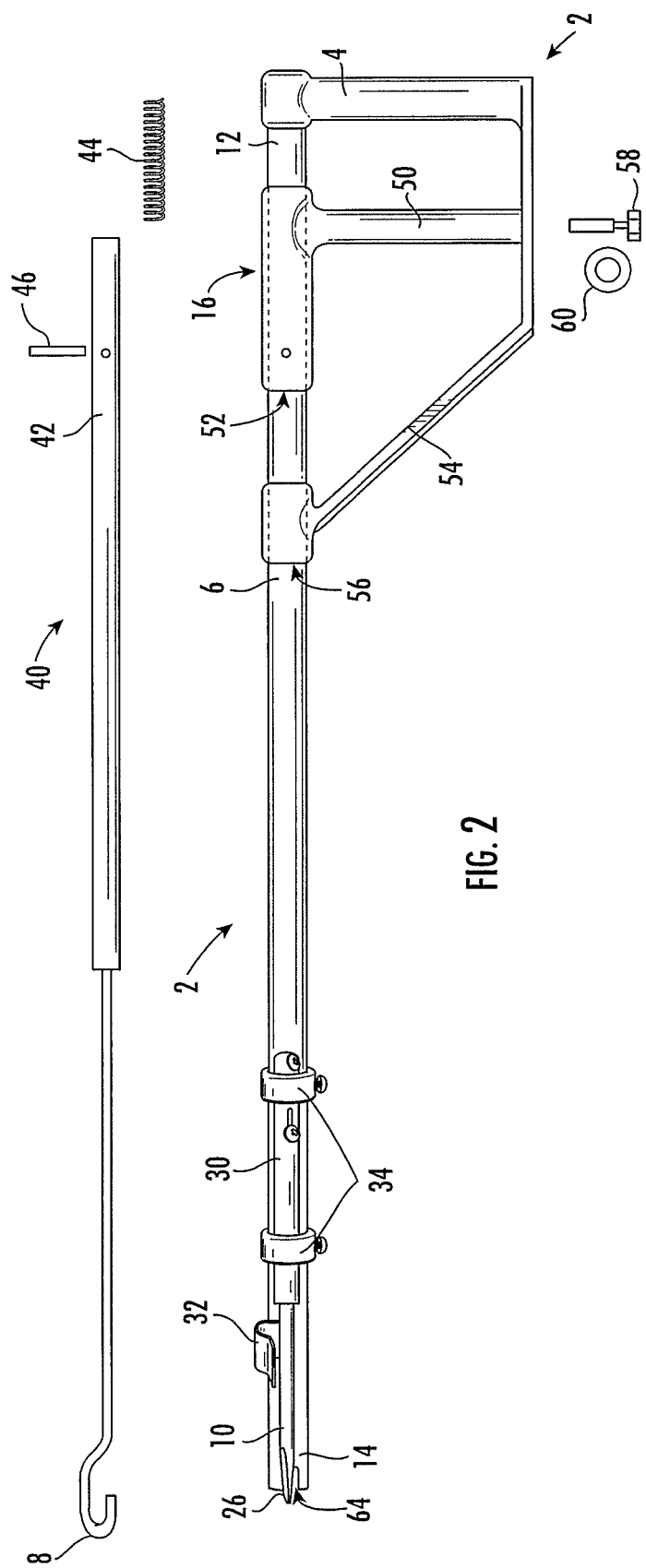
FIG. 2 is an exploded sectional view of a fishhook remover, in accordance with some embodiments herein.
Figure 3A:
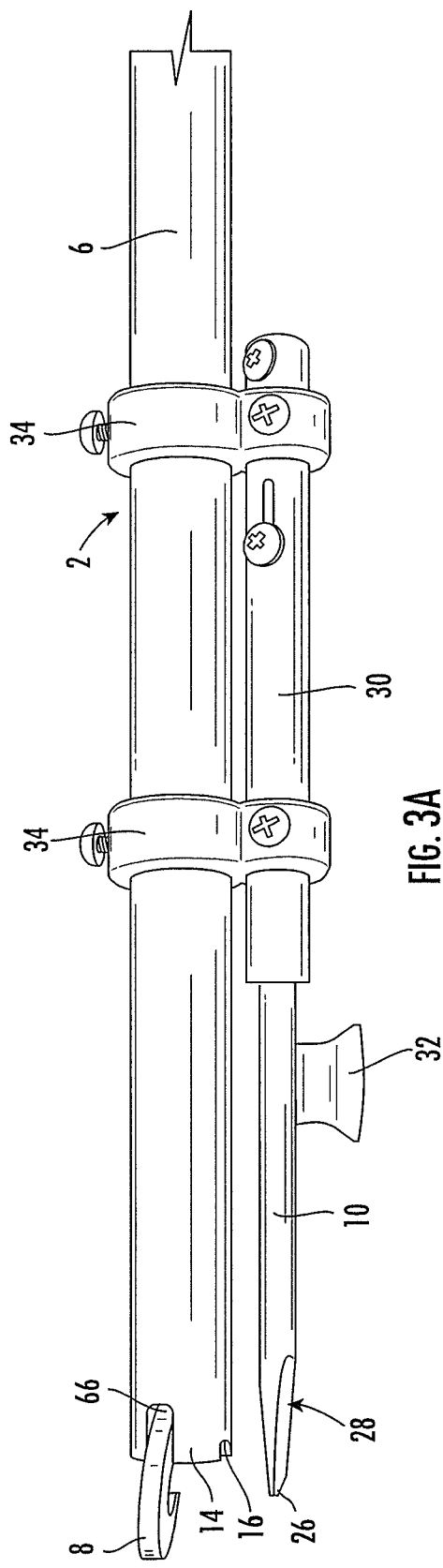
FIG. 3A shows a partial side view of the fishhook remover, in accordance with some embodiments described herein.
Figure 3B:
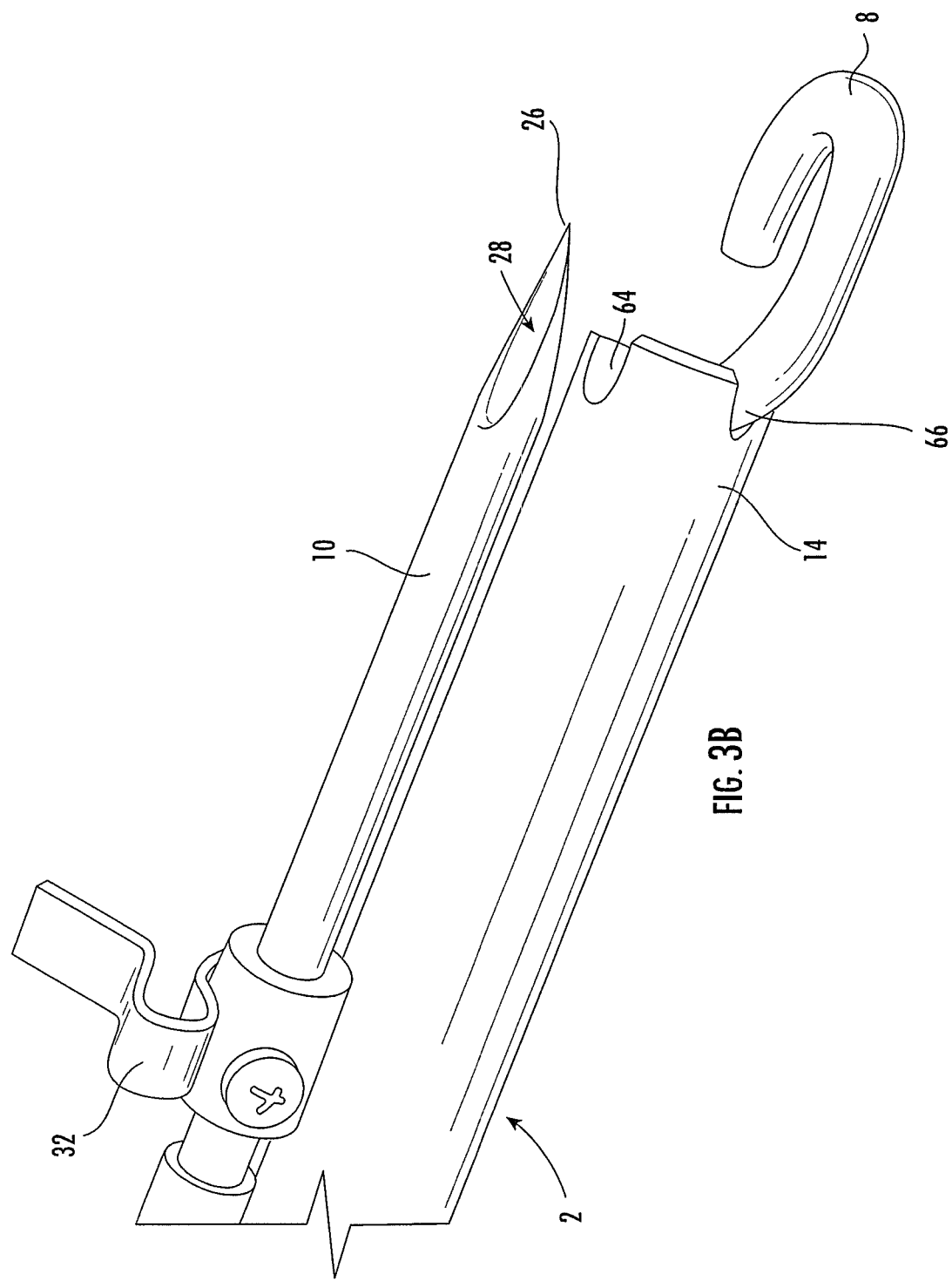
FIG. 3B shows a partial perspective view of the fishhook remover, in accordance with some embodiments described herein.
Figure 4B:
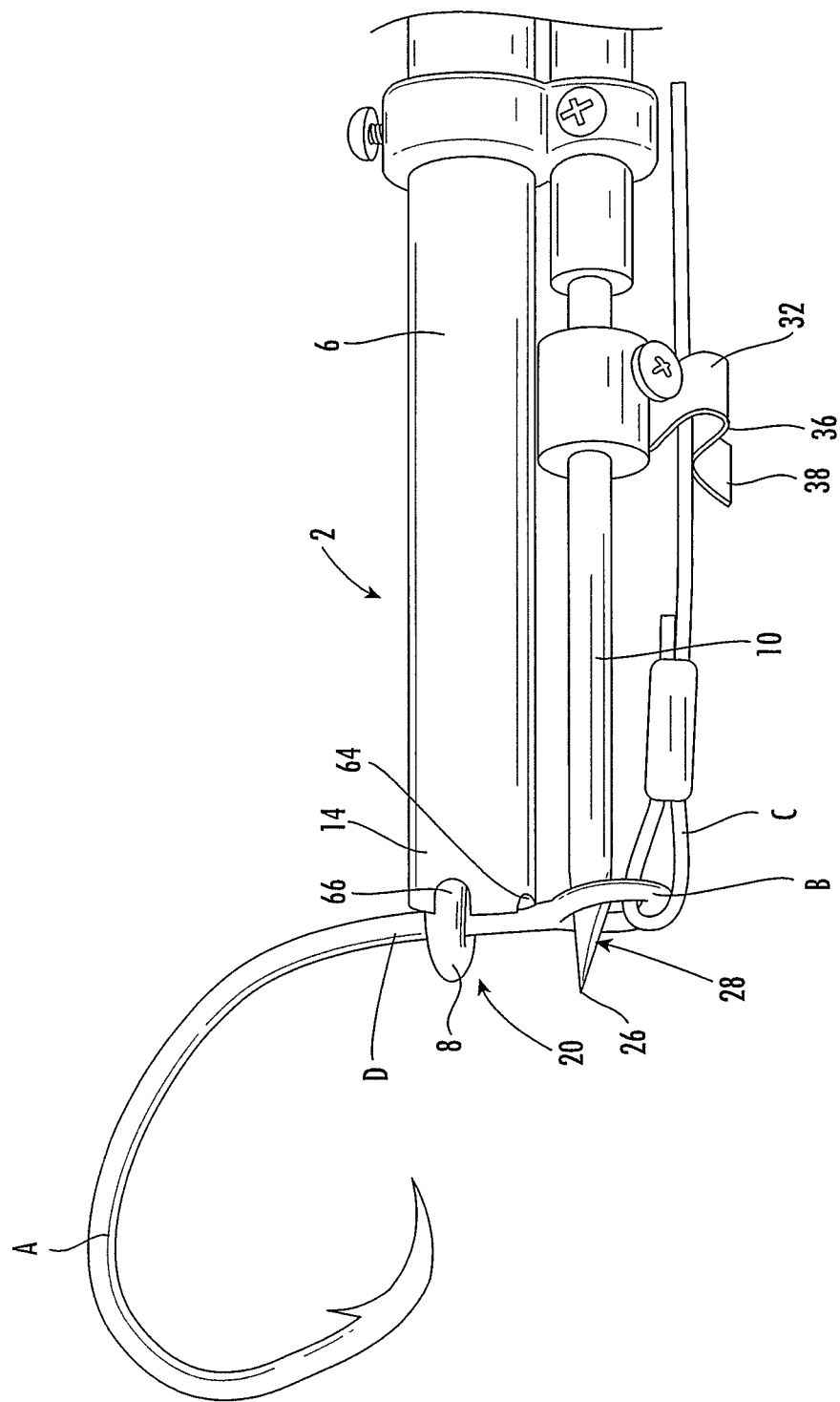
FIG. 4B shows the retractable grabber in its retracted position securely holding the fishhook, the guide assembly engaging the fishing line, and the fishhook alignment needle engaging the eye of the fishhook, in accordance with some embodiments described herein.

In some embodiments, as shown in FIGS. 1 and 2, for example, the fishhook remover (2) includes an actuating member (16). The actuating member (16) is adapted to move the grabber (8) between an extended position (18) and a retracted position (20). For example, FIG. 4A shows that when the grabber (8) in an extended position (18) the shank (D) of the fishhook (A) fits in the space between the grabber (8) and the front of the second end (14) of the shaft (6), and FIG. 4B shows that when the grabber (8) in a retracted position (20) there is no space between the grabber (8), the fishhook (A), and the front of the second end (14) of the shaft (6). Thus, in the retracted position (20), the shank (D) of the fishhook (A) is securely retained to the front of the second end (14) of the shaft (6).

In some embodiments, as shown in FIG. 2, the retractable grabber (8) has a linking portion (40) extending longitudinally through the bore of the hollow shaft (6) that connects the grabber (8) to the actuating member (16). The linking portion (40) can be any suitable size and shape. For example, the linking portion (40) can be a cylindrical rod, something similar (e.g., hexagonal rod, octagonal rod), or a combination of differently sized rods; and the linking portion (40) can be made out of any suitable material, such as a metal, a metal alloy, plastic, or the like.

In some embodiments, for example, as shown in FIG. 2, the linking portion (40) includes a first rod portion (42) having a larger diameter than the portion leading to the grabber (8). In some embodiments, the first rod portion (42) includes a through-hole that is configured to receive a pin (46), or a plurality of pins, to secure the first rod portion (42) to the actuating member (16). In some embodiments, the fishhook remover (2) includes a compressible member (44) that works in conjunction with the linking portion (40) and the actuating member (16) to move the grabber (8) between the extended position (18) and the retracted position (20). In some embodiments, the compressible member (44) is a spring, for example. In use, when the angler actuates the actuating member (16), the pin (46) connecting the first rod portion (42) to the actuating member (16) causes the linking member (40) to move the grabber (8) from the extended position (18) to the retracted position (20). The compressible member (44) provides resistance to the actuating, and also restores the grabber to its extended position (18) when the actuating member (16) is released by the user.

In some embodiments, the linking portion (40) can be made out of a single component or a plurality of components. The linking portion (40) can be modified to adapt how the actuating member (16) moves the retractable grabber (8). In other embodiments, the linking portion (40) can include or substitute additional/different components to actuate the grabber (8), such as a cable, pulley, and/or a magnet.

In some embodiments, as shown in FIGS. 6A and 6B, the grabber (8) is configured to move between the initial position (22) shown in FIG. 6B and the engaging position (24) shown in FIG. 6A. As shown in FIGS. 6A and 6B, there is relatively more space between the grabber (8) and the alignment needle (10) to receive a fishhook when the grabber is in the initial position (22) because the grabber (8) is longitudinally spaced apart from front of the second end (14) and laterally spaced away from a cross-sectional center of the shaft (6). In such embodiments, the grabber (8) in the initial position (22) is off-center with respect to the shaft (6) when the grabber (8) is fully extended and can rest against a sidewall of the shaft (6). In use, the additional space created by having the grabber (8) off-center with respect to the shaft (6) makes it easier for the angler to insert the alignment needle (10) into the eye (B) of a fishhook and bring the shank (D) of the fishhook into position across the front of the second end (14) of the shaft (6) so it can be grabbed and retained by the grabber (8). When the actuating member (16) is actuated by a user and the grabber (8) has engaged the shank (D) of the fishhook (A), the grabber (8) retracts into the shaft (6), and the shape (e.g., hook-shape, question mark shape) of the grabber (8) causes the portion of the grabber (8) resting against the sidewall of the shaft (6) is pushed out toward the cross-sectional center of the shaft (6).

Figure 9:
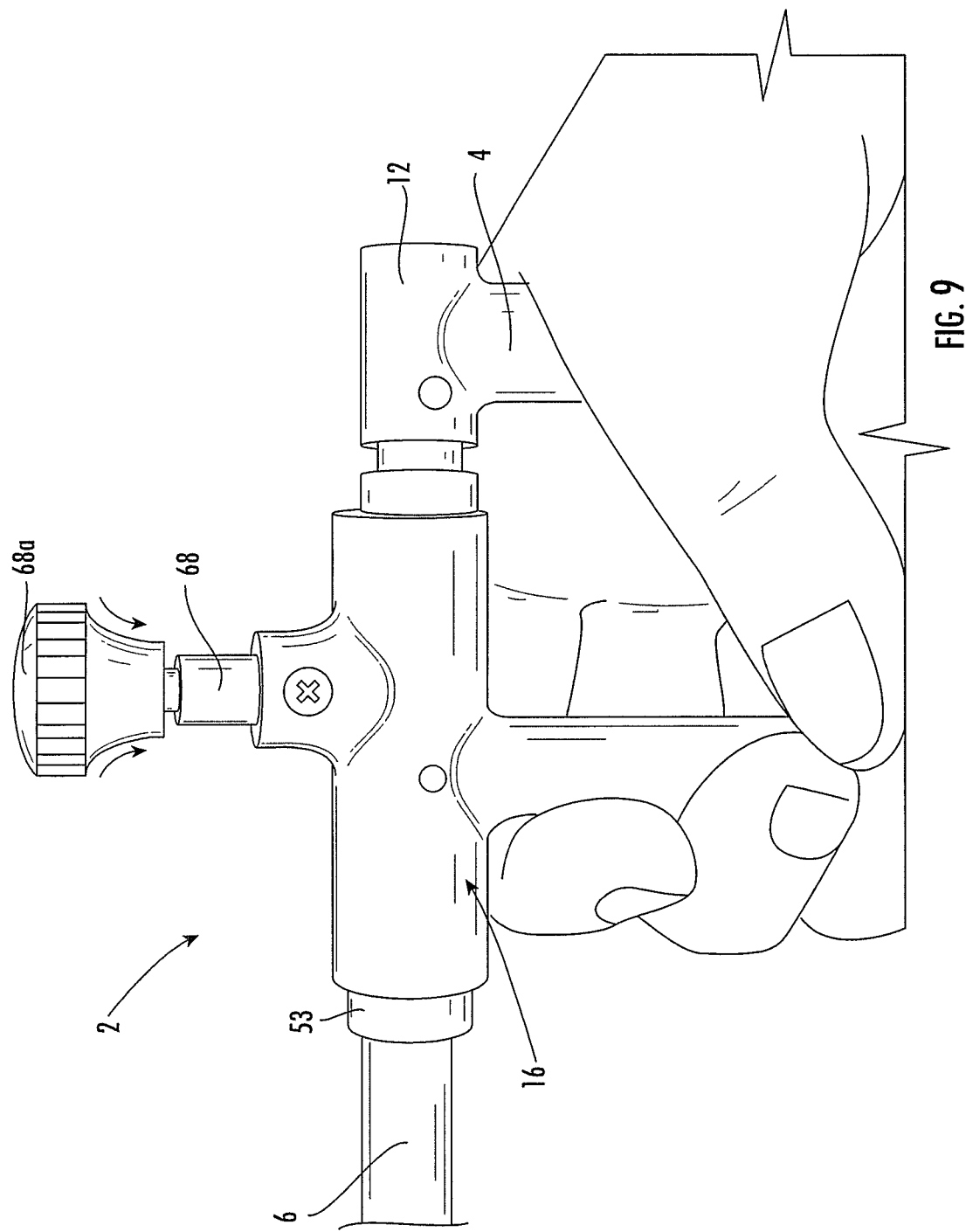
FIG. 9 is a partial side view showing the locking component of the fishhook remover, in accordance with some embodiments described herein.
Figure 10A:
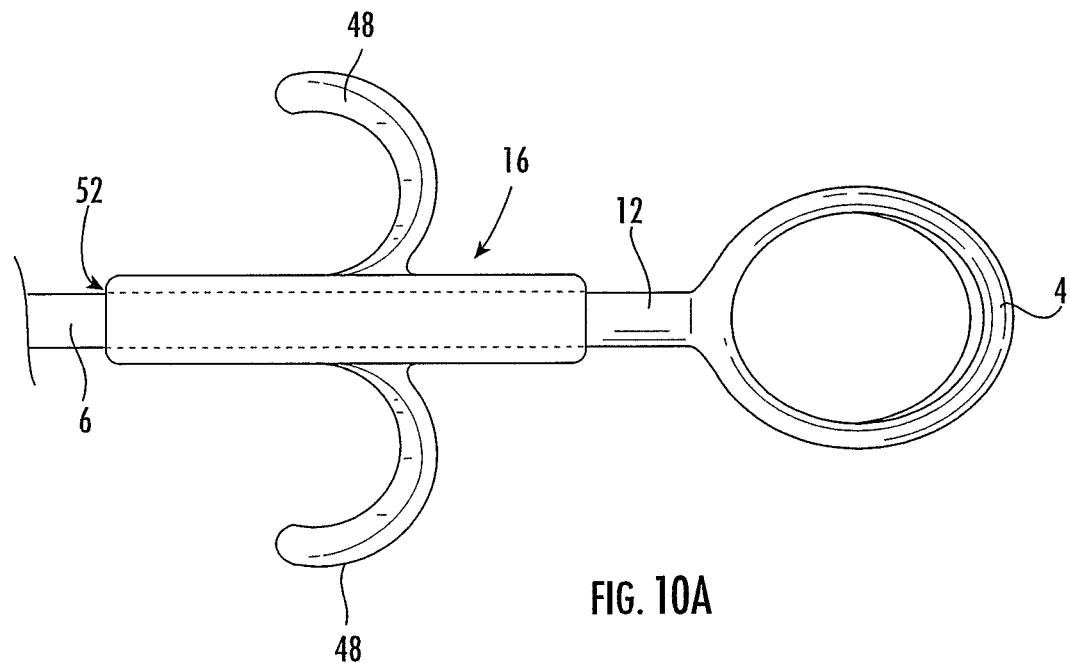
FIGS. 10A-10D are partial side views of different examples of the handle of the fishhook remover, in accordance with some embodiments described herein.
Figure 10B:
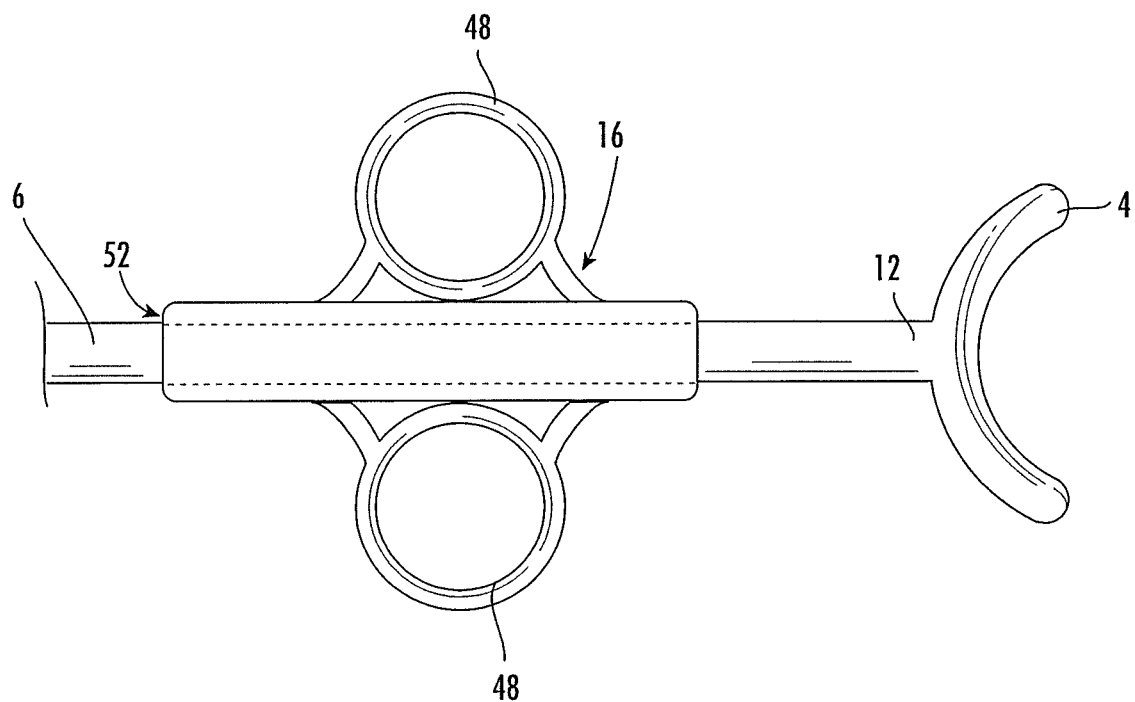

As shown in FIGS. 1, 10A, 10B, and 10D, in some embodiments the actuating member (16) includes a trigger (48). Alternatively, as shown in FIGS. 10A and 10B, the actuating member (16) can include a plurality of triggers (48). In some embodiments, the actuating member (16) includes a grip (50). Alternatively, the actuating member (16) can include a plurality of grips (50). In some embodiments, the actuating member (16) includes an opening (52) for receiving the shaft (6). For example, as shown in FIG. 2, the actuating member (16) can include a hollow cylindrical portion with an opening (52) for the shaft (6) to pass through. As shown in FIG. 9, the actuating member (16) is positioned on the shaft (6) in proximity to the handle (4) so a user can hold the handle (4) in the palm of her hand and reach the actuating member (16) with her fingers such that the user can squeeze the actuating member (16) toward the handle (4) with a single hand while dehooking a catch.

In some embodiments, as shown in FIG. 9, for example, the actuating member (16) includes a locking member (68) for locking the actuating member (16) in position when it is fully actuated and the grabber (8) is in the retracted position (20). The locking member (68) includes a locking component, such as pin or, that locks the actuating member (16) to the shaft (6) or, alternatively, to the handle (4). The locking member (68) also includes a releasing component (68a), such as a spring-loaded pull knob, screw knob, switch, etc., in communication with the locking component for deactivating the actuating member (16) and allowing the grabber (8) to return back to the extended position (18). Other locking and releasing components are contemplated.

As shown in FIGS. 1 and 3A-7B, the fishhook alignment needle (10) is positioned and aligned next to the shaft (6) such that the shank (D) of the fishhook (A) can be engaged by the hook-shaped grabber (8) when the fishhook alignment needle (10) is inserted into the eye (B) of the fishhook. When the grabber (8) is actuated from the extended position (18) to the retracted position (20), as shown in FIG. 4B, the fishhook (A) is held securely by both the grabber (8) and the fishhook alignment needle (10). This allows the angler to have much more control of the fishhook (A) while dehooking the fishhook from the catch. In some embodiments, the fishhook alignment needle (10) is provided in proximity to the second end (14) of the hollow shaft (6). In some embodiments, the longitudinal axis of the fishhook alignment needle (10) is parallel to the shaft (6).

The fishhook alignment needle (10) comprises a pointed end (26) for inserting into the eye (B) of the fishhook (A). As shown in FIGS. 1 and 3A-7B, for example, in some embodiments the pointed end (26) is positioned in proximity to the second end (14) of the hollow shaft (6). In use, as shown in FIGS. 4A and 4B, the pointed end (26) can be inserted into the eye (B) of the fishhook first, then position the fishhook remover (2) to bring the grabber (8) into position over the shank (D) of the fishhook (A) and fully actuate the grabber (8) into the retracted position (20) to secure the fishhook.

Figure 5A:
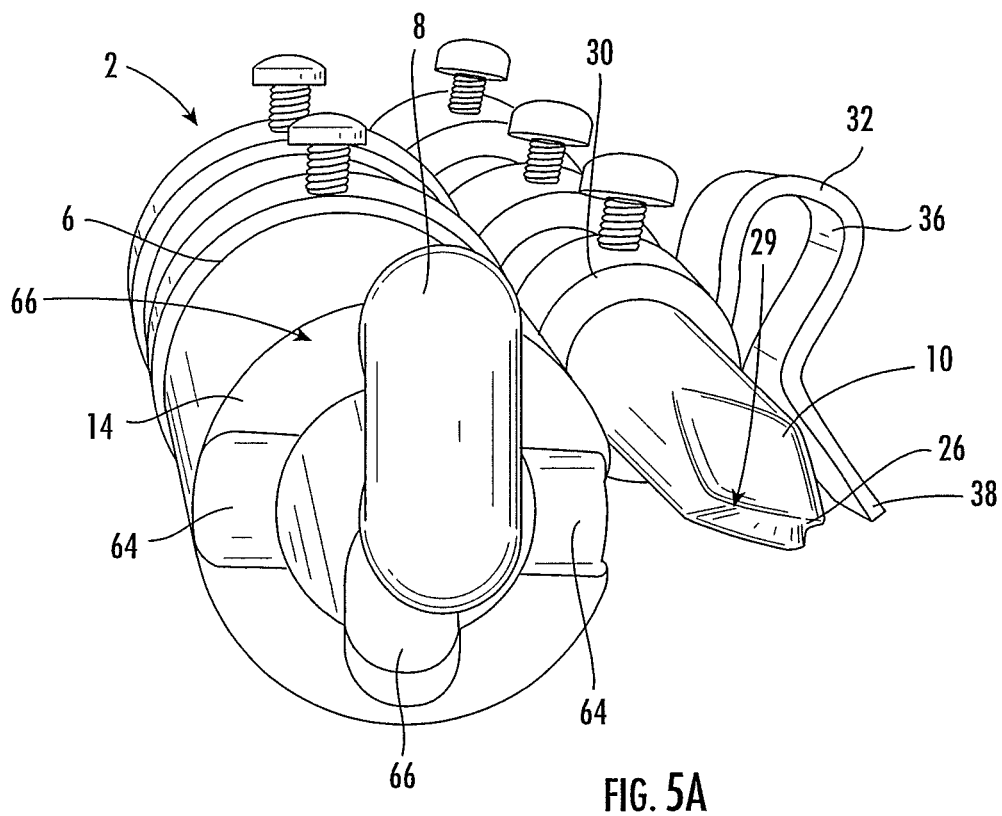
FIG. 5A is an oblique view of the fishhook remover from the front end, in accordance with some embodiments described herein.
Figure 5B:
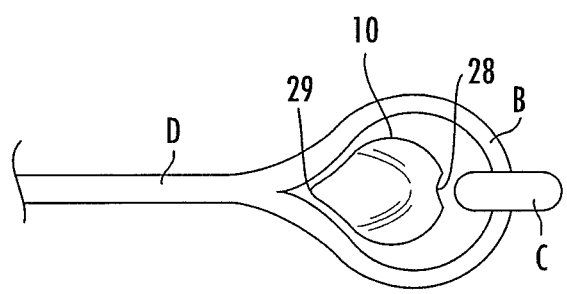
FIG. 5B is a partial view showing the fishhook alignment needle engaging the eye of the fishhook, in accordance with some embodiments described herein.

As shown in FIGS. 2, 3A, 3B, 4A, 4B, and 5B in some embodiments, the pointed end (26) includes a longitudinally oriented channel (28) or a groove to receive and accommodate the fishing line (C) that is feeding through the fishhook eye (B). The fishing line connected to the fishhook may be a leader line, and the channel (28) provides space for both the fishing line (C) and the pointed end (26) to pass through the fishhook eye (B). The longitudinally oriented channel (28) also secures the fishing line (C) in a position where it will not interfere with dehooking the fishhook from the catch. For example, FIG. 5B shows a fishhook alignment needle (10) engaging the eye (B) of the fishhook (A). The channel (28) is oriented on the side facing the fishing line (C).

As shown in FIGS. 5A and 5B, in some embodiments, the pointed end (26) includes an elevated edge or ridge (29) that can be received in the point of a teardrop-shaped fishhook eye (B). The ridge (29) is oriented opposite to the channel (28) with respect to the pointed end (26). The ridge (29) is on the shaft side of the alignment needle (10) and, on the other side of the alignment needle (28), the channel (28) faces away from the shaft (6). In use, as shown FIGS. 4A, 5A, and 5B, the ridge (29) is aligned with the point of a teardrop-shaped eye when the pointed end (26) is inserted into the eye, and such an alignment prevents the fishhook from rotating about the fishhook alignment needle (10).

In some embodiments, the fishhook remover (2) includes an alignment assembly (30), as shown in FIGS. 1, 2, 3A-7B. The alignment assembly (30) can be coupled to the shaft (6) with a removable coupler (34) or a plurality of couplers (34). Alternatively, the alignment assembly (30) can be integrally formed with the shaft (6) (i.e., out of a single piece of material). In some embodiments, the one or more couplers (34) can be configured so the alignment assembly (30) is rotatably adjustable or slidably adjustable with respect to the shaft (6). In some embodiments, the fishhook alignment needle (10) is attached to the shaft (6) by the alignment assembly (30).

In embodiments, as shown in FIGS. 7A and 7B, the alignment assembly (30) is configured to hold a portion of the fishhook alignment needle (10) and to receive an additional portion of the needle (10) when the needle (10) is compressed in a longitudinal direction toward the first end (12) of the shaft (6). In such embodiments, when a fishhook (A) engaging the alignment needle (10) is pulled toward the second end (14) of the shaft (6) and the retractable hook-shaped grabber (8) is actuated toward the retracted position (20), the needle (10) is compressed into the alignment assembly (30) toward the first end (12) of the shaft (6). In such embodiments, the alignment assembly (30) includes a compressible member that is in contact with the fishhook alignment needle (10) to enable this feature. For example, the compressible member can be a spring or an elastomer. This means that when the fishhook (A) is held securely in the retracted position shown in FIG. 4B, the spring-loaded alignment needle (10) is in its compressed configuration is pressed against the fishhook eye (B) that is being held in place and being pulled in the opposite direction by the grabber (8), thus enabling the fishhook remover (2) to very securely hold the fishhook (A).

As shown in FIGS. 1, 2, and 3-6B, in some embodiments the fishhook remover (2) includes a guide assembly (32). The guide assembly (32) is configured to retain the fishing line (C) close to the shaft (6) and away from the fishhook or catch, and to prevent the fishing line from getting tangled. The guide assembly (32) is shown in FIG. 3B as being attached to the hook alignment needle (10), but can be any suitable size and shape. The guide assembly (32) can be attached to the shaft (6) or the alignment assembly (30). In some embodiments, as shown in FIGS. 4A, 4B, and 5A, the guide assembly (32) includes a looping or curved portion (36) for cradling the fishing line (C) and can also include a flat portion (38) extending from the curved portion (36) for guiding and/or directing the fishing line (C) toward the curved portion (36). The flat portion (38) can be any suitable length and width. For example, the flat portion (38) can extend from the curved portion (36) with a rectangular structure, a trapezoidal structure, or any other shape that can increase the zone for directing the fishing line toward the curved portion (36). In some embodiments, the guide assembly (32) is adjustable. For example, a user can compress, expand, or otherwise configure the guide assembly (32) to obtain larger or smaller looping or curved portion (36) depending on the diameter or thickness of the fishing line being used. The guide assembly (32) can be any suitable material, including metals, metal alloys, and plastics.

As shown in FIGS. 4A, 4B, and 5A, in some embodiments the second end (14) of the shaft (6) includes a pair of opposing slots or grooves (64) aligned to receive the shank (D) of the fishhook (A). In some embodiments, the opposing slots (64) are in an orthogonal orientation with respect to the hook-shaped grabber (8). In some embodiments, the pair of opposing slots (64) align in a straight line with the fishhook alignment needle (10). When the grabber (8) is in the retracted position (20), as shown in FIG. 4B, the shank (D) of the fishhook is securely cradled in the pair of opposing slots (64). This allows the angler to have more control of the fishhook (A) while dehooking the fishhook from the catch.

As shown in FIGS. 3-5A, in some embodiments the second end (14) of the shaft (6) includes a slot or groove (66) positioned to receive a portion of the hook-shaped grabber (8) when the grabber is retracted into the front of the second end (14). In some embodiments, the second end (14) of the shaft (6) includes a pair of slots or grooves (66) positioned to receive portions of opposing sides of the grabber (8) as the grabber is being retracted into the shaft (6). In some embodiments, the one or more opposing slots (66) are in an orthogonal orientation with respect to the pair of opposing slots or grooves (64) aligned to receive the shank (D) of the fishhook (A). When the grabber (8) is in the retracted position (20), as shown in FIG. 4B, the slots/grooves (66) provide additional room for the grabber (8) to be further recessed within the second end (14) of the shaft (6). This allows the angler to have more control of the fishhook (A) while dehooking the fishhook from the catch.

Figure 8:
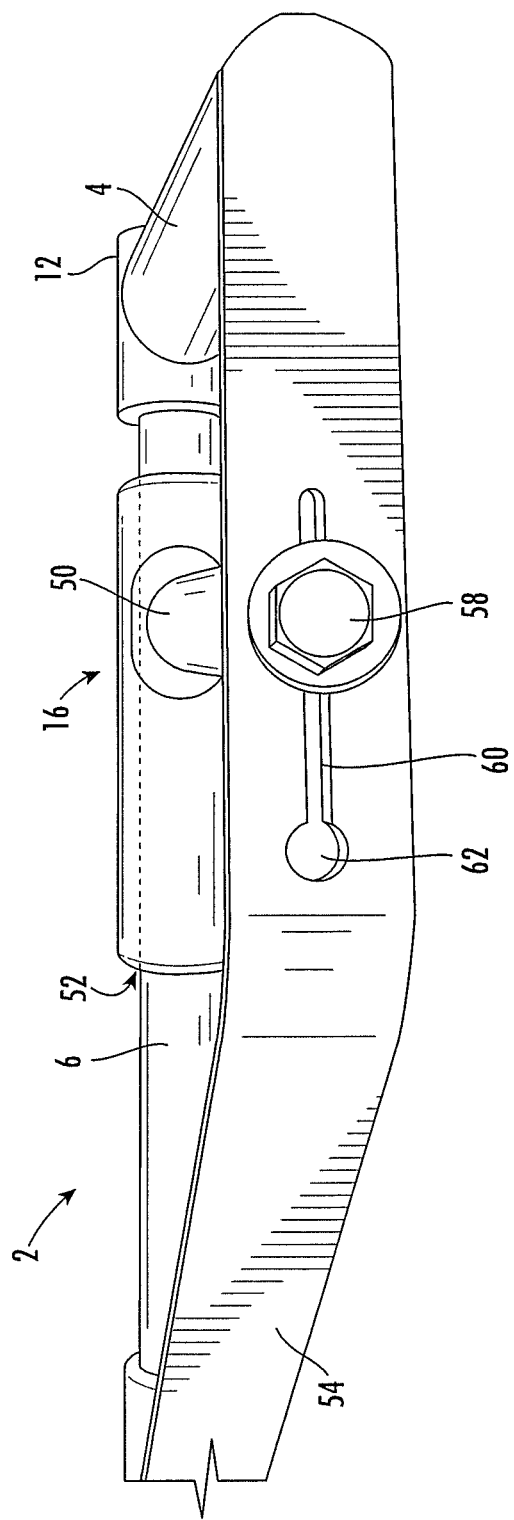
FIG. 8 is an oblique view of the fishhook remover's handle from the bottom side, in accordance with some embodiments described herein.

As shown in FIGS. 1, 2, and 8-10D, for example, the handle (4) is attached to the first end (12) of the shaft (6). In some embodiments, as shown in FIGS. 1, 2, 8, 10C, and 10D, the fishhook remover (2) includes a stabilizing member (54) that provides a second connection between the handle (4) and the shaft (6), and therefore greater stability when the angler is handling the fishhook remover (2). The stabilizing member (54) includes a through-hole (56) for receiving the shaft (6). In some embodiments, the actuating member (16) is connected to the stabilizing member (54). The actuating member (16) can be connected to the stabilizing member (54) using a fastener (58). The fastener (58) can be any suitable fastener, including, for example, a screw, or bolt. In some embodiments, the fastener (58) can be fastened to the actuating member (16) with a spacer (60), such as a washer. In some embodiments, the stabilizing member (54) is connected to a grip (50) in communication with the actuating member (16). As shown in FIG. 8, for example, the stabilizing member (54) includes a slot (62) through which the fastener (58) can be fastened to the actuating member (16). In some embodiments, the stabilizing member (54) includes a slot (62) through which the fastener (58) can be slidably fastened to the actuating member (16). In some embodiments, the slot (60) can include a circular opening (62) through which the fastener (58) can be inserted or removed from. In use, the stabilizing member (54) provides rotational stability to the actuating member (16). As such, the actuating member (16) cannot rotate about the shaft (6), or otherwise compromise the components securing within the actuating member (16) (e.g., a pin (46) as shown in FIG. 2). The stabilizing member (54) also provides additional support to the handle (4). Without the stabilizing member (54), the distal end of the grip (50), as shown in FIGS. 1, 2, 10C, and 10D, may be bent toward the shaft (6).

As shown in FIG. 9, in some embodiments the fishhook remover (2) includes an intermediate layer (53) between the shaft (6) and the actuating member (16). The intermediate layer (53) can be comprised of any suitable material. For example, in some embodiments the intermediate layer (53) is plastic, metal, rubber, thin films, etc. In use, the intermediate layer (53) reduces the friction between the shaft (6) and the actuating member (16) when both components are made out of metal. The intermediate layer (53) can be any suitable length with respect to the longitudinal axis of the shaft (6). In some embodiments, the intermediate layer (53) extends only to the front end and/or rear end of the actuating member (16), or to about the front and/or rear ends of the actuating member (16). In some embodiments, the intermediate layer (53) extends beyond the front and/or rear ends of the actuating member (16).

Figure 10C:
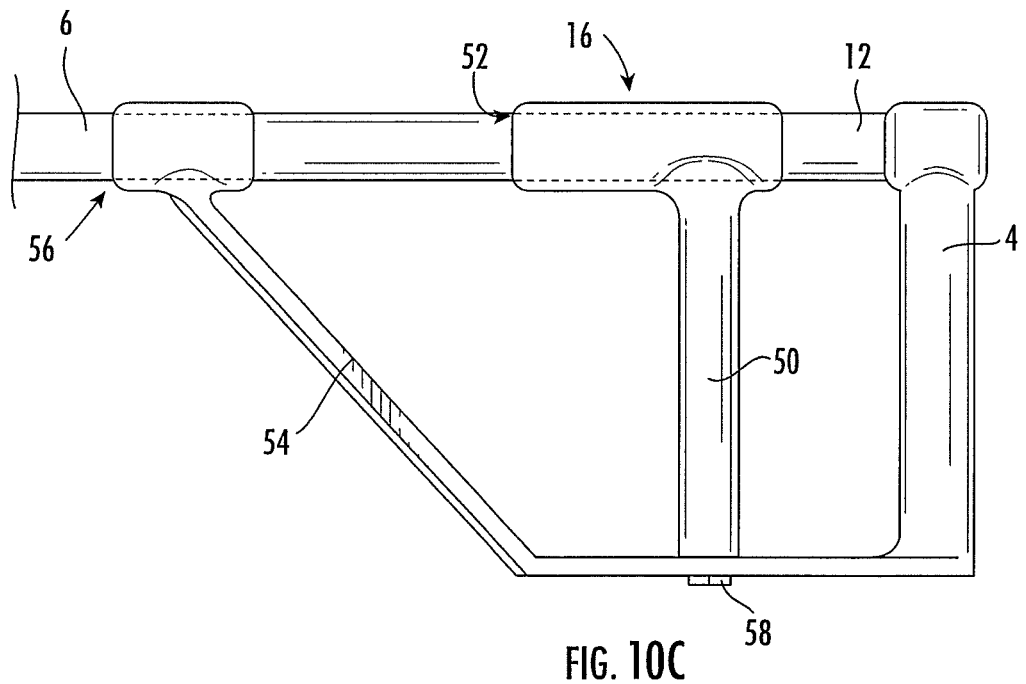
Figure 10D:
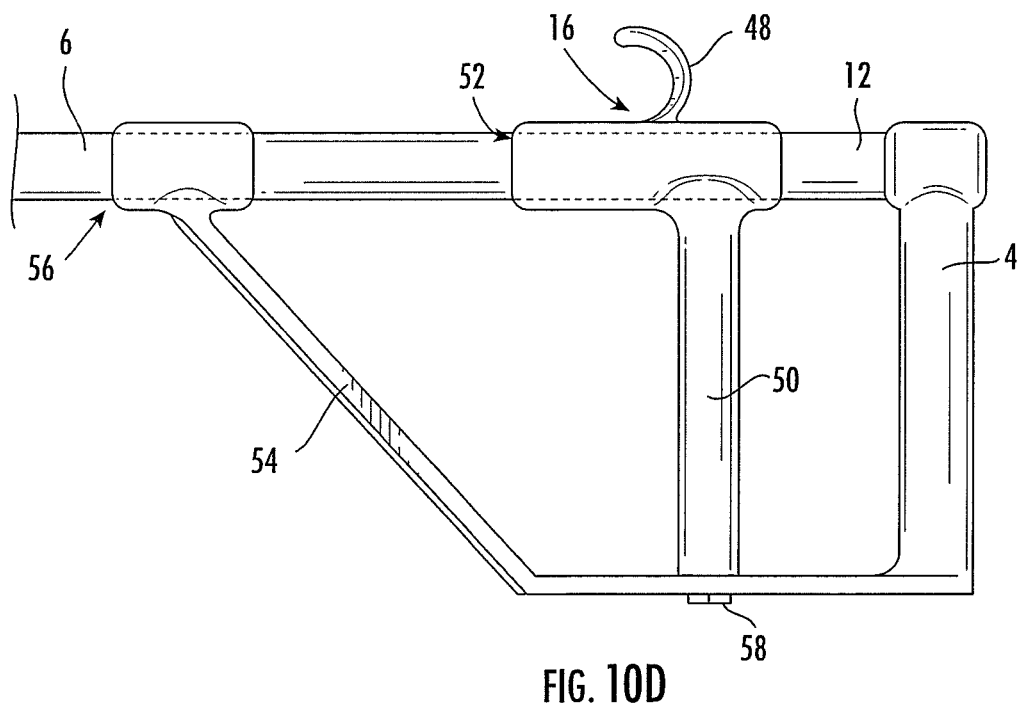

The handle (4) can be any suitable size and shape. FIGS. 10A-10D, for example, illustrate some different handles having suitable shapes and sizes. In some embodiments, as shown in FIG. 10A, the handle (4) is O-shaped and the triggers (48) on the actuating member (16) are C-shaped. In use, the handle (4) can be received by a user's thumb while the user's fingers engage the triggers (48). In some embodiments, as shown in FIG. 10B, the handle (4) is C-shaped and the triggers (48) are ring-shaped. In use, the handle (4) can be secured on the portion of a user's hand between the thumb and forefinger while the user's other fingers engage the triggers (48). In some embodiments, as shown in FIGS. 10C and 10D, the handle (4) is a bar. In use, the bar can be secured in the palm of a user's hand and between the user's thumb and forefinger while the user's fingers engage the grip (50) on the actuating member (16). In some embodiments, as shown in FIG. 10D, the actuating member (16) includes a trigger (48). The various features described in FIGS. 10A-10D can be combined in any and all combinations. For example, the C-shaped handle (4) in FIG. 10B can be combined with the C-shaped triggers (48) in FIG. 10A. Other combinations are contemplated.

The fishhook remover (2) according to the embodiments described herein can be used to remove a variety of fishhooks from a fish, including J-hooks, circle-hooks, and treble hooks. As would be appreciated by one of ordinary skill in the art, the fishhook remover (2) can be utilized when a fish is in close proximity (e.g., a few inches to several feet). A user can remove the fishhook (A) by engaging the fishhook alignment needle (10) with the eye (B) of the fishhook, engaging the retractable hook-shaped grabber (8) with the shank (D) of the fishhook, and activating the actuating member (16) to retract the grabber (8) into the shaft (6). Alternatively, the user can engage the retractable hook-shaped grabber (8) with the shank (D) of the fishhook, engage the fishhook alignment needle (10) with the eye (B) of the fishhook, and then activate the actuating member (16) to retract the grabber (8) into the shaft (6). In addition, the user can direct the fishing line (C) to the guide assembly (32). After the fishing line (C) is cradled in the guide assembly (32), the fishhook remover (2) can be pushed toward the fishhook and the pointed end (26) of the alignment needle (10) can be inserted into the eye (B) of the fishhook. The ridge (29) of the pointed end (26), when in engaged with the point of a teardrop-shaped eye (B), will orient the shank (D) of the fishhook across the second end (14) of the shaft (6). When the shank (D) of the fishhook is in that position, the grabber (8) can be retracted into the shaft (6) to secure the fishhook (A) for removal from the catch. Because the shank (D) of the fishhook (A) is secured by both the grabber (8) and the alignment needle (10) of the fishhook remover (2), the removal of the fishhook is unexpectedly easier and more efficient than with conventional dehookers, which typically grab a curved area (e.g., bend) of the fishhook. Further, removal of a fishhook with the fishhook remover (2) according to the embodiments described herein causes significantly less damage to the fish compared to removal of a fishhook with conventional dehookers.

The foregoing is provided for purposes of illustrating, explaining, and describing embodiments of this invention. Modifications and adaptations to these embodiments will be apparent to those skilled in the art and may be made without departing from the scope or spirit of this invention.

Although the subject matter has been described in terms of exemplary embodiments, it is not limited thereto. Rather, the appended claims should be construed broadly, to include other variants and embodiments, which may be made by those skilled in the art.

The invention claimed is:

1. A fishhook remover for dehooking a fishhook from a catch, the fishhook remover comprising:
   a hollow shaft comprising a first end, a second end, and a bore extending from the first end to the second end, and a handle provided at the first end, wherein the bore opens at the second end;
   a retractable hook-shaped grabber for grabbing and retaining the fishhook, wherein the grabber is provided within the bore of the hollow shaft and extends out from the second end, wherein the grabber is connected via a linking member to an actuating member slidably engaging the hollow shaft, wherein the actuating member is provided between the first end and the second end for actuating the grabber between an extended position and a retracted position, and a fishhook alignment needle for engaging an eye of the fishhook that is to be grabbed by the grabber, wherein an engaging end of the fishhook alignment needle is provided in proximity to the second end of the hollow shaft, wherein the fishhook alignment needle is attached to the hollow shaft by an alignment assembly having first and second ends, wherein the alignment assembly comprises an opening at the second end of the alignment assembly configured to receive a portion of the fishhook alignment needle, wherein the alignment assembly is attached to the hollow shaft such the first end of the alignment assembly is located between the first and second ends of the hollow shaft and a portion of an outer surface of the alignment assembly faces a portion of an outer surface of the hollow shaft, wherein the fishhook alignment needle is positioned and aligned such that the fishhook securely engaged by the hook-shaped grabber is contacted against diametrically opposing surfaces of the second end of the shaft and the fishhook alignment needle is inserted into the eye of the fishhook when the grabber is fully actuated into the retracted position, enabling the fishhook to be dehooked from the catch.

2. The fishhook remover of claim 1, wherein the engaging end of the fishhook alignment needle comprises a point for inserting into the eye of the fishhook.

3. The fishhook remover of claim 1, wherein the engaging end of the needle comprises a longitudinally oriented groove depressed into a body of the needle, the groove configured for receiving a fishing line that has been fed through the fishhook eye.

4. The fishhook remover of claim 1, further comprising a guide assembly attached to the fishhook alignment needle, and configured to retain a fishing line feeding through the fishhook eye.

5. The fishhook remover of claim 4, wherein the guide assembly comprises a curved portion for accommodating the fishing line.

6. The fishhook remover of claim 5, wherein the guide assembly further comprises a flat portion extending from the curved portion for guiding the fishing line toward the curved portion.

7. The fishhook remover of claim 1, wherein the longitudinal axis of the fishhook alignment needle is parallel to the shaft.

8. The fishhook remover of claim 1, further comprising the linking portion extending through the hollow shaft and connecting the retractable hook-shaped grabber and the actuating member.

9. The fishhook remover of claim 8, wherein the actuating member comprises a trigger and a grip.

10. The fishhook remover of claim 9, wherein the actuating member comprises a through-hole for receiving the shaft.

11. The fishhook remover of claim 9, wherein the actuating member is in proximity to the handle close enough to be grabbed by one hand that is holding the handle.

12. The fishhook remover of claim 11, further comprising a stabilizing member connecting the handle to the hollow shaft, wherein the stabilizing member comprising a through-hole for receiving the shaft.

13. The fishhook remover of claim 1, wherein the hollow shaft is an elongated tube.

14. The fishhook remover of claim 13, wherein the diametrically opposing surfaces of the second end of the shaft comprises a pair of slots on diametrically opposing sidewalls of the shaft that are aligned with each other to receive the fishhook's shank in an orthogonal orientation with respect to the hook-shaped grabber.

15. The fishhook remover of claim 14, wherein the pair of slots align in a straight line with the fishhook alignment needle.

16. The fishhook remover of claim 14, wherein the second end of the shaft further comprises a third slot positioned to receive the hook-shaped grabber when the grabber is retracted into the shaft toward the retracted position.

17. The fishhook remover of claim 1, wherein the engaging end of the fishhook alignment needle comprises a ridge that is shaped and configured to be received within a pointed space of a teardrop shape of the eye of the fishhook.

* * * * *